United States Patent
Soroushian et al.

(10) Patent No.: US 8,243,804 B2
(45) Date of Patent: Aug. 14, 2012

(54) HIERARCHICAL MOTION ESTIMATION FOR IMAGES WITH VARYING HORIZONTAL AND/OR VERTICAL DIMENSIONS

(75) Inventors: Kourosh Soroushian, San Jose, CA (US); Soo-Chul Han, Pleasanton, CA (US)

(73) Assignee: LSI Corporation, Milpitas, CA (US)

( * ) Notice: Subject to any disclaimer, the term of this patent is extended or adjusted under 35 U.S.C. 154(b) by 1632 days.

(21) Appl. No.: 11/292,198

(22) Filed: Dec. 1, 2005

(65) Prior Publication Data

US 2007/0127573 A1    Jun. 7, 2007

(51) Int. Cl.
*H04N 7/12*        (2006.01)
*H04N 11/02*       (2006.01)

(52) U.S. Cl. ............... 375/240.16; 375/240.21

(58) Field of Classification Search ............ 375/240.16, 375/240.21, E7.107, E7.211, E7.258
See application file for complete search history.

(56) References Cited

U.S. PATENT DOCUMENTS

| 7,751,478 B2* | 7/2010 | Kim et al. ............... 375/240.12 |
| 2004/0013199 A1* | 1/2004 | Winger et al. ........... 375/240.16 |
| 2006/0104360 A1* | 5/2006 | Gordon .................... 375/240.16 |

* cited by examiner

*Primary Examiner* — King Poon
*Assistant Examiner* — Neil R McLean
(74) *Attorney, Agent, or Firm* — Christopher P. Maiorana, PC

(57) ABSTRACT

A method for implementing motion estimation comprising the steps of (A) performing a motion estimation search on one or more blocks of sub-sampled images to generate a first plurality of motion vector scores, (B) applying a first adjustable bias to any one or more of said first plurality of motion vector scores with a lowest sum of absolute differences score, (C) selecting a motion vector with a lowest adjusted score in response to applying the first adjustable bias, (D) performing a motion estimation search on one or more blocks of non-sub-sampled images to generate a second plurality of motion vector scores with the selected motion vector with the lowest adjusted score, (E) applying a second adjustable bias to any one or more of the second plurality of motion vector scores with the lowest sum of absolute differences score and (F) selecting a final motion vector for each target block position.

20 Claims, 4 Drawing Sheets

HIERARCHICAL MOTION ESTIMATION FOR IMAGES WITH VARYING HORIZONTAL AND/OR VERTICAL DIMENSIONS

FIELD OF THE INVENTION

The present invention relates to imaging processing generally and, more particularly, to a method and/or apparatus for implementing hierarchical motion estimation (ME) in images with varying horizontal and vertical dimensions.

BACKGROUND OF THE INVENTION

Digital video compression may be defined as the process of transforming analog video into a digital representation at a fraction of the storage space. Such a transformation (or encoding) is carried out via the digital sampling of the analog video. After sampling, specific processes are applied to the raw digital samples in order to transform the new digital samples into a digital bitstream of fixed and variable-length codewords. These codewords are later processed by a digital video decoder. The codewords are later transformed back to analog video for presentation on a traditional television monitor.

Digital video encoding encompasses a wide range of processes which transform the analog video into a final compressed bitstream. Such a transformation includes stages such as (i) image capture and pre-processing, (ii) motion estimation (ME), (iii) discrete-cosine transformation, and (iv) the generation of fixed and variable-length codewords. In the encoding process, motion estimation is generally the most processor-intensive segment. Motion estimation involves comparing a block-based target with a reference picture. Each block in the target image is searched in the reference image for the closest match. There are varying methods for performing such a search. There are also differing systems for determining the closest match. The goal of performing motion estimation is to transfer one or more vectors pointing to a combination of one or more blocks that form a prediction error. When one or more blocks are a close match, the target block will be presented.

Referring to FIGS. 1-2, a diagram illustrating a block based motion estimation search is shown. A target image is divided into target blocks. Each target block is searched in a larger area in the reference image. The basic building block of a motion-estimator is the ability to perform sum of absolute differences (SAD). A pixel-by-pixel sum of absolute differences for each position of the target block in the reference search area is calculated. The search coordinate which produces the lowest SAD score is chosen as the final match in that particular reference area. The lowest SAD score for a particular target block may also be defined as a "motion vector score" or a "score from the motion vector". The reference area may be as small as one target block, or as large as the entire reference image. A search offset starting at a (0, 0) offset may be positioned from the target location to anywhere else within the reference image coordinates.

A hierarchical motion estimation search program generally involves (i) sub-sampling an image in the horizontal and/or in the vertical directions and (ii) using the results of the sub-sampled image to perform a new ME image search with adjusted starting reference points (X, Y) at a correspondingly higher resolution. The combined hierarchy of searches with further refinement at each search stage results in an accurate local match between the target block and the combined reference search areas.

There are typically several challenges in designing a hierarchical motion estimation search program. The total engine cycles must be considered and compared with the available encoding CPU allocation. The SAD operation for a block can be from between 1 to n clock cycles, depending on the built-in hardware acceleration of the motion-estimation engine and the desired search area in the reference frame. In addition to the raw computational cycles, memory bandwidth associated with the loading of the target and reference areas must also be carefully evaluated.

The sub-sampling of images can only be carried to a reasonable degree. For example, sub-sampling smaller target and references frames may severely distort the quality of the image to the point that the resulting search vectors may not correctly correspond to the actual search results.

The combination of the search ranges, when scaled to the original image size, constitute an adequately large percentage of the reference image. Such a challenge must be achieved while observing the typically significant computational standards for the motion estimation process in a limited CPU performance scenario.

With advanced coding standards, multiple block-sizes can be supported for motion estimation and compensation. The adaptive choice of using multiple block sizes generally helps in reducing the prediction error. Such a reduction improves the coding efficiency of the stream. However, additional searches may be needed between the target and reference frames.

It would be desirable to implement a hierarchical motion estimation search program that complies with MPEG-4 standards or variations of MPEG-1 and/or MPEG-2 standards which include image dimensions of varying horizontal and vertical sizes.

SUMMARY OF THE INVENTION

The present invention concerns a method for implementing motion estimation comprising the steps of (A) performing a motion estimation search on one or more blocks of sub-sampled images to generate a first plurality of motion vector scores, (B) applying a first adjustable bias to any one or more of the first plurality of motion vector scores with a lowest sum of absolute differences score, (C) selecting a motion vector with a lowest adjusted score in response to applying the first adjustable bias, (D) performing a motion estimation search on one or more blocks of non-sub-sampled images to generate a second plurality of motion vector scores with the selected motion vector with the lowest adjusted score, (E) applying a second adjustable bias to any one or more of the second plurality of motion vector scores with the lowest sum of absolute differences score and (F) selecting a final motion vector for each target block position.

The objects, features and advantages of the present invention include providing a method and/or apparatus for a hierarchical motion estimation that may (i) be useful in image sequencing with varying horizontal and/or vertical dimensions (ii) be adapted to new encoding standards such as MPEG-4 and/or (iii) provide an easy to implement method for performing motion estimation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
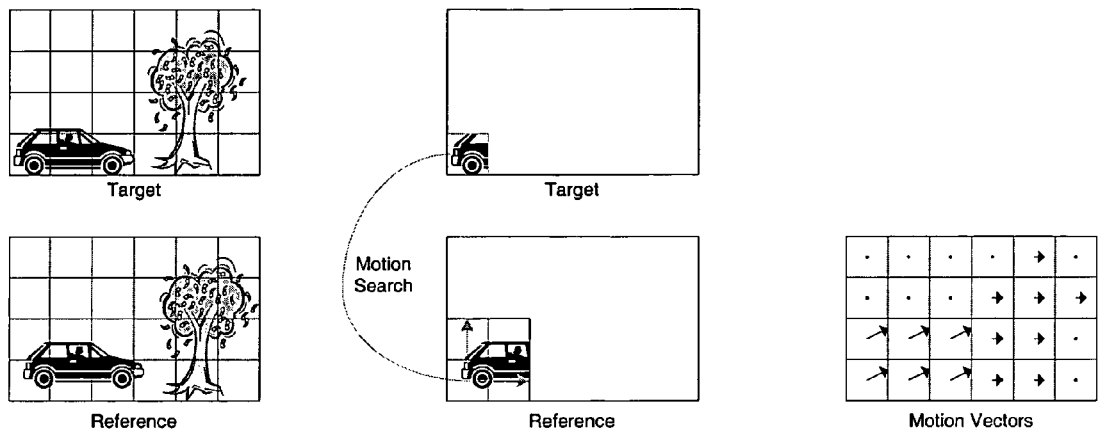
FIG. 1 is a block diagram of a block-based motion estimation search.
Figure 2:
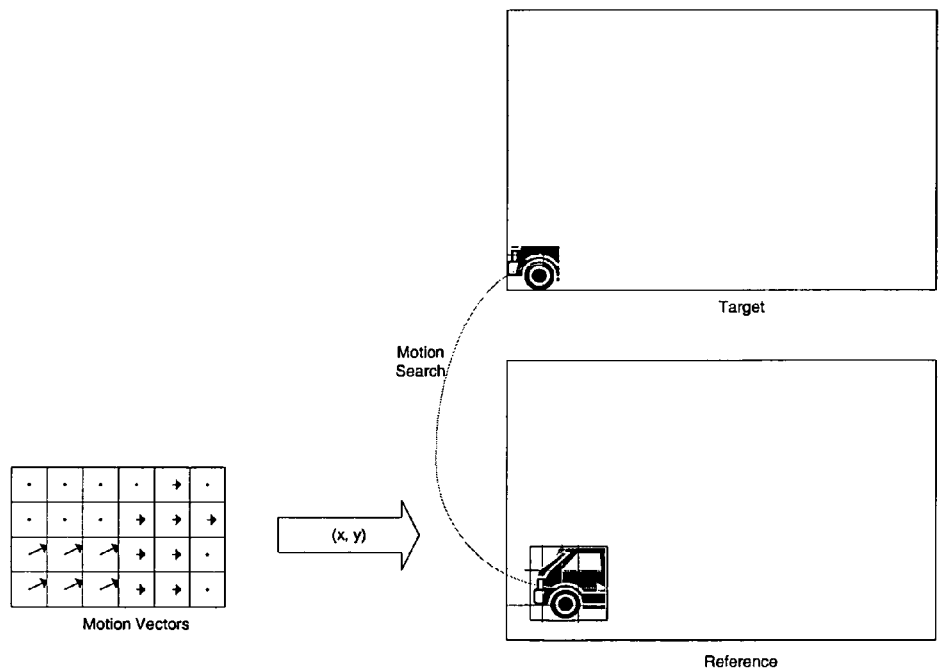
FIG. 2 is a block diagram of a hierarchical motion search example.
Figure 3:
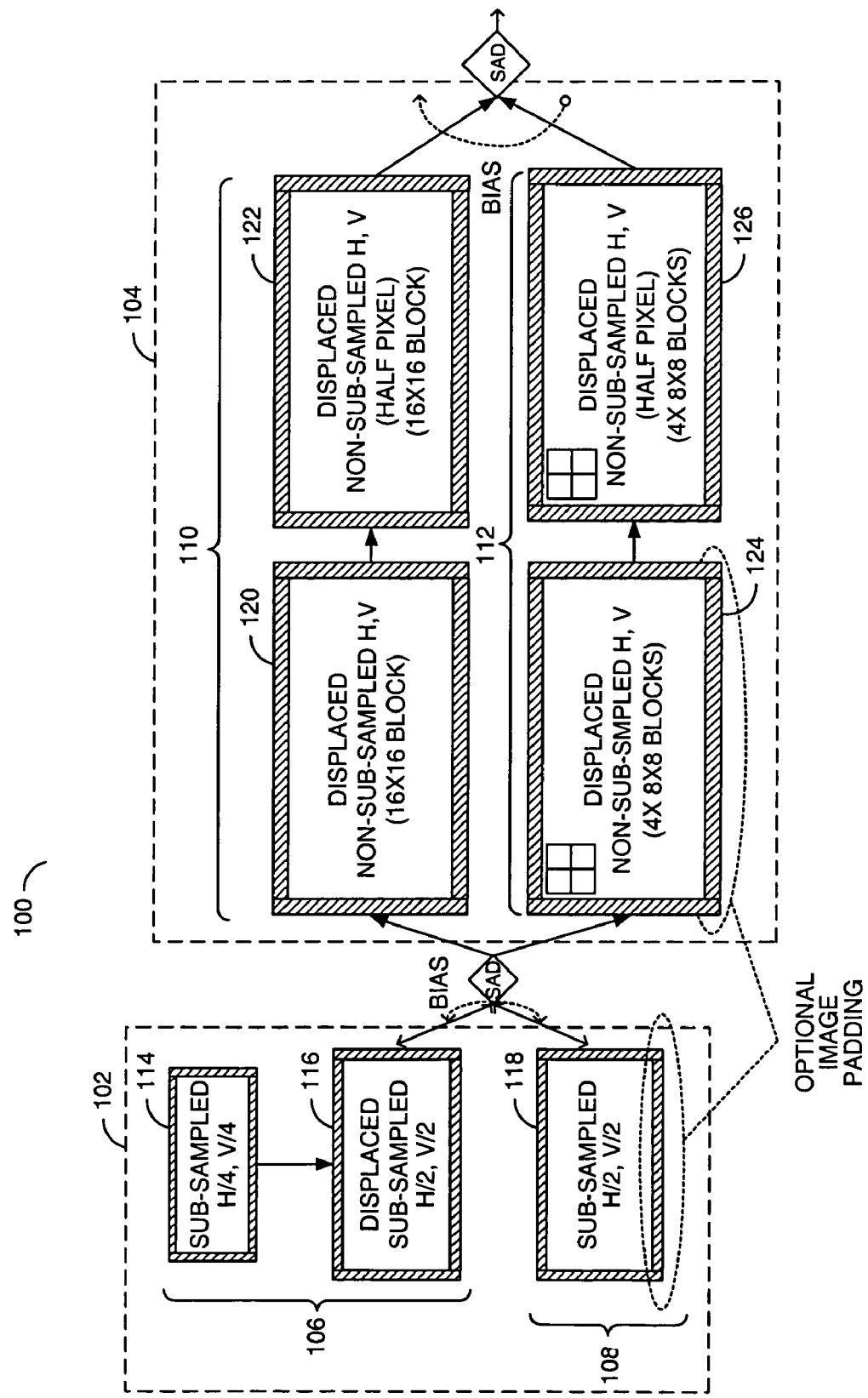
FIG. 3 is a block diagram illustrating motion estimation in accordance with the present invention.

Referring to FIG. 3, a diagram illustrating a motion estimation system 100 is shown. The system 100 comprises a block (or phase) 102 and a block (or phase) 104. The phases 102 and 104 may be implemented as parallel motion-estimation search phases. The motion estimation search phases 102 and 104 generally occur with full-pixel sum of absolute difference (SAD) comparisons. The phases 102 and 104 may implement 8×8 target blocks and different reference search areas.

The phase 102 generally comprises a search stage 106 (or first search stage) and a search stage 108 (or second search stage). The search stage 106 may perform a two-stage search. The search stage 106 generally comprises a search block 114 and a search block 116. The search stage 108 may perform a single stage search. The search block 114 may perform a motion estimation search with a quarter resolution sub-sampled image (e.g., sub-sampled H/4 and V/4). The search block 116 may perform a motion estimation search on displaced motion vectors (H,V) on a half-resolution sub-sampled image (e.g., displaced sub-sampled H/2 and V/2). The search block 116 may perform the ME search by selecting displaced motion vectors based on motion estimation scores generated from the search block 114. The search stage 108 may be implemented as a search block. The search block 108 may also perform a motion estimation search with a half-resolution sub-sampled image (e.g., sub-sampled H/2 and V/2).

The search stages 106 and 108 may generate a first plurality of motion vector scores. A first adjustable bias may be applied to the first plurality of motion vector scores with the lowest SAD score prior to the search in the phase 104. The first adjustable bias may depend on a set of predetermined operating procedures. The predetermined operating procedures may include visual and/or statistical analysis of the displacement error generated between target and reference frames after applying the motion estimation results.

Applying the first adjustable bias (based on the dimensions of the target and reference frame) to the motion vectors scores with the lowest SAD score between the search blocks 106 and 108 may enable the handling of various horizontal and vertical resolution combinations. The first adjustable bias may be a predetermined integer value. The predetermined integer value may be applied to motion vector scores in a linear or non-linear fashion.

The system 100 may be capable of performing hierarchical motion estimation search on image sizes as small as in the range of 176×112 up to the range of 720×576 or even larger. Performing excessive decimation on images smaller than a certain size (e.g., 352×288) may lead to the detection of erroneous motion-vectors and ultimately poor encoding quality. As a result, at a certain threshold, the first adjustable bias may favor the results generated from the search stage 108 rather than the results generated from the search stage 106. Alternatively, a decimation by 4 stage may be helpful for larger images such as 720×480, so that block displacements may be detected. The first adjustable bias may be adjusted accordingly for larger images.

The phase 104 generally comprises a search stage 110 (or third search stage) and a search stage 112 (or fourth search stage). The search stages 110 and 112 may each perform a two-stage search. The search stages 110 and 112 may search via a full-resolution (H, V) target/reference image. The search stage 110 generally comprises a search block 120 and a search block 122. The search block 120 may perform a motion estimation search on displaced non-sub-sampled motion vectors (H,V) on a full resolution 16×16 target block (e.g., displaced non-sub-sampled H,V (16×16 block)). The search block 120 may use the lowest SAD scores adjusted by the first adjustable bias from the phase 102. The search block 120 may perform the motion estimation search in a non-zero offset reference area. The search block 122 may perform an ½-pixel ME search on displaced non-sub-sampled motion vectors (H,V) on a full resolution 16×16 target block (e.g., displaced non-sub-sampled H, V (half pixel) (16×16 block)). The search block 122 may perform the ME search by selecting the displacement motion vectors based on ME scores generated from the search block 120.

The search stage 112 generally comprises a search block 124 and a search block 126. The search block 124 may perform a motion estimation search on displaced non-sub-sampled motion vectors (H,V) on full resolution original 4 8×8 target blocks (e.g., displaced non-sub-sampled H,V (4 8×8 blocks)). The search block 124 may use the lowest SAD adjusted by the first adjustable bias from the phase 102. The search block 124 may perform a search at the full resolution. The search block 126 may perform an ½-pixel ME search on displaced non-sub-sampled motion vectors (H,V) on full resolution 4 8×8 blocks (e.g., displaced H,V (half pixel) (4×8×8 blocks)). The search block 126 may perform the ME search by selecting the displacement motion vectors based on ME scores generated from the search block 124. In general, with the search stages 110 and 112, there may be a processing penalty associated with coding 4 motion vectors versus one. Favoring the results of the search stage 110 over the search stage 112 (unless the search stage 112 outperforms the search stage 110) may reduce such a penalty.

The search stages 110 and 112 may generate a second plurality of motion vector scores. A second adjustable bias may be applied to the second plurality of motion vector scores with the lowest SAD score. The second adjustable bias may comprise predetermined image values applied to the motion vector scores in a linear or non-linear fashion. In general, the actual value of the first adjustable bias and the second adjustable bias may be obtained from a large number of predetermined operating procedures. One such operating procedure may be obtained by performing statistical analysis, and/or comparing motion vector scores between (i) the search block 116 and the search block 118 and (ii) the search block 122 and the search block 126. The second adjustable bias may ensure the results are better than the non-biased search results. After applying the second adjustable bias, a final motion-vector set may be selected for each target block position. The motion vectors generated by the sub-sampled image search in the phase 102 may be correctly scaled to corresponding blocks of the sub-sampled image in the next phase 104.

In performing the hierarchical un-restricted motion estimation search, the original reference images are normally padded via an appropriate pixel-replication pattern in either the horizontal and/or vertical directions. The padded pattern may be (i) scaled accordingly for the sub-sampled motion-estimation stages (from the phase 102) and (ii) used as an expanded reference picture where target blocks may be searched (from the phase 104). The final motion vectors (which may be pointing outside of the viewable picture) may be clipped at a fixed pixel boundary such as +/−16 pixels.

In general, the unrestricted motion-estimate searches in the system 100 performs an extraneous search outside of the image boundaries by padding the images with a replicated row of pixels taken from a corresponding edge. For example, such corresponding edges may be defined by the MPEG-4 video standard. The system 100 may incorporate the hierarchical motion-estimation along with unrestricted the motion estimation search.

The system 100 may perform a search with the phase 102 on sub-sampled images and a search with the phase 104 on original block data to provide coverage for a larger possible search area. There may be an inherent cost in terms of performance cycles associated with performing motion estimation. A large reference search area at full resolution may be very costly in terms of silicon performance. Therefore, with the present invention, an image may be sub-sampled, and the motion-displacement with the lowest scores is normally used to search the second stage. The present invention may lead to the coverage of a larger possible search area by (i) searching a sub-sampled image and (ii) applying the motion displacement with the lowest SAD scores to the phase 104.

Figure 4:
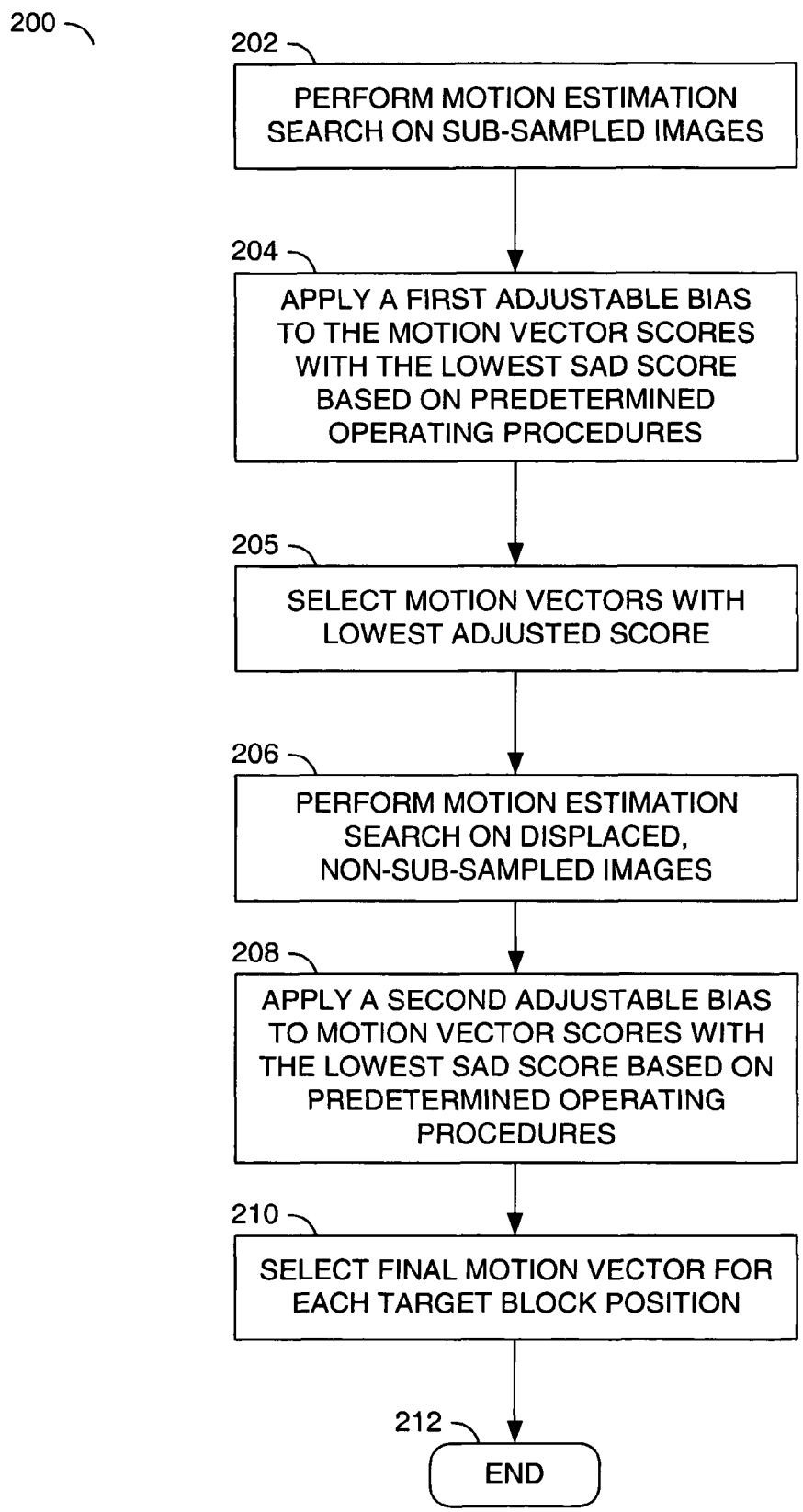
FIG. 4 is a flow diagram illustrating motion estimation in accordance with the present invention.

Referring to FIG. 4, a flow diagram 200 of the present invention is shown. The flow diagram 200 generally comprises a step (or state) 202, a step (or state) 204, a step (or state) 205, a step (or state) 206, a step (or state) 208, a step (or state) 210 and a step (or state) 212. The step 202 may perform a motion estimation search on one or more sub-sampled images. The step 204 may apply a first adjustable bias to the motion vector scores with the lowest SAD scores. The step 205 may select motion vectors with the lowest adjusted score. The step 206 may perform a motion estimation search on displaced non-sub-sampled images. The step 208 may apply a second adjustable bias to the motion vector scores with the lowest SAD scores. The step 210 may select a final motion vector for each target block position. The step 212 may end the process 200.

Figure 5:
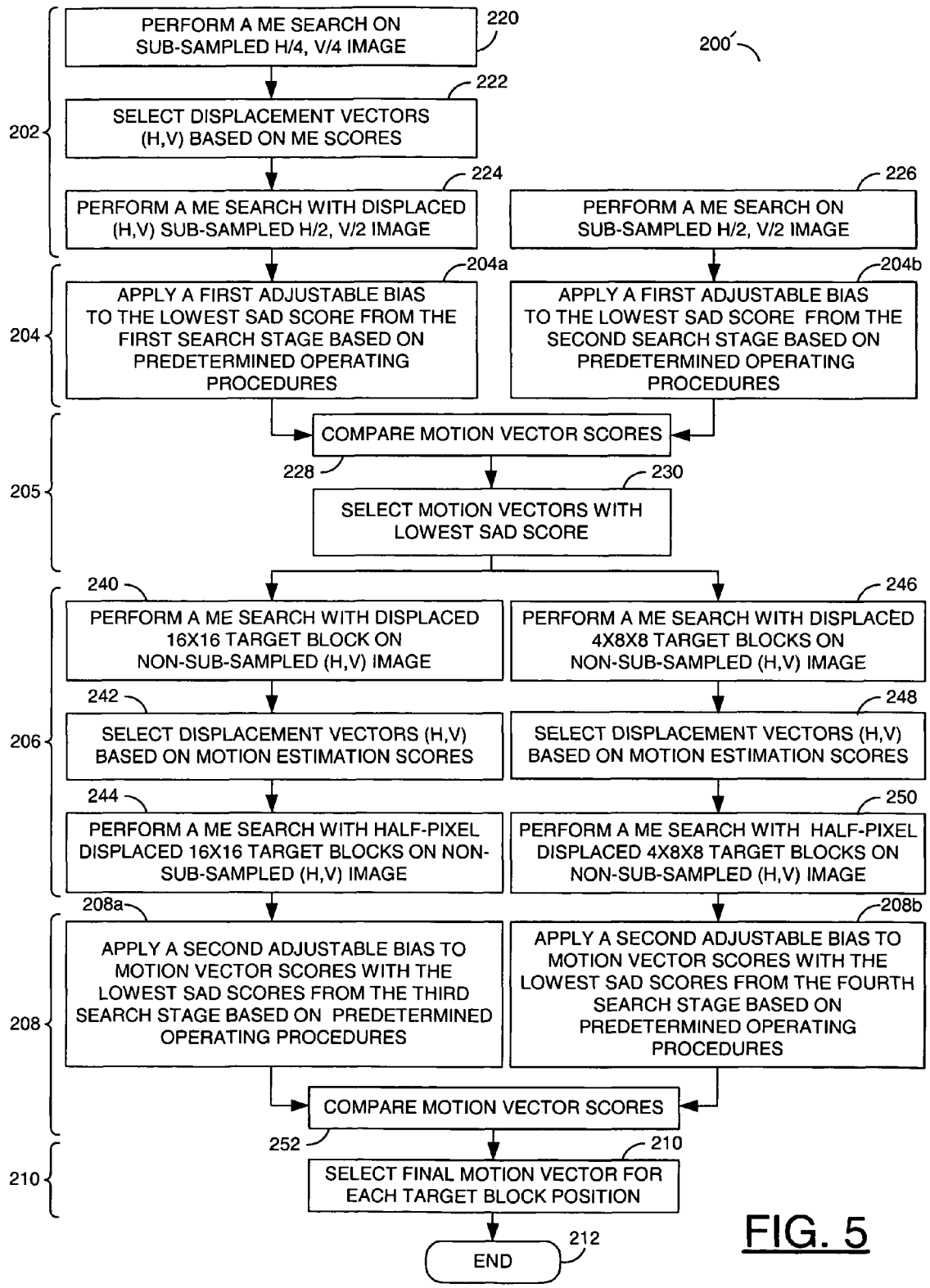
FIG. 5 is a more detailed flow diagram.

Referring to FIG. 5, a more detailed flow diagram 200' is shown. The state 202 is shown comprising a state 220, a state 222, a state 224, and a state 226. The state 220 may perform the ME search on the sub-sampled H/4, V/4 image. The state 222 may select displacement vectors H,V based on motion estimation scores generated by the state 220. The state 224 may perform the ME with the displaced sub-sampled H/2, V/2 images. The state 226 may perform the ME search on the sub-sampled H/2, V/2 image. The state 204 generally comprises a state 204a and a state 204b. The state 204a may apply a first adjustable bias to the motion vector scores with the lowest SAD score generated from the first search stage 106. The state 204b may apply the first adjustable bias to the motion vector scores with the lowest SAD score generated from the second search stage 108. The state 228 may compare the motion vector scores between the state 204a and the state 204b. The state 230 may select the motion vectors with the lowest adjusted score.

The state 206 generally comprises a state 240, a state 242, a state 244, a state 246, a state 248, and a state 250, The state 240 may perform the ME search with the 16×16 target block on a non-sub-sampled (H,V) image. The state 240 may perform the ME search with the displaced 16×16 target block on the non-sub-sampled (H,V) image with the first adjustable bias that was added to the motion vector scores with the lowest SAD scores from the step 204. The state 242 may select displacement vectors (H,V) based on motion estimation scores generated by the state 240. The state 244 may be an optional state that may perform a half pixel ME search with the displaced 16×16 target block on non-sub-sampled (H,V) image with the results generated for the state 244. The state 246 may perform the ME search with displaced 4 8×8 blocks on the non-sub-sampled (H,V) image. The state 246 may perform the ME search with the displaced 4 8×8 blocks on the non-sub-sampled (H,V) image with the first adjustable bias that was added to the motion vector scores with the lowest SAD scores. The state 248 may select displacement vectors (H,V) based on motion estimation scores generated by the state 246. The state 250 may be an optional state that perform a half-pixel ME search with half-pixel displaced 4 8×8 target blocks on the non-sub-sampled (H,V) image with the results of the state 248. The state 208 generally comprises the state 208a, the state 208b and the state 252. The state 208a may apply a second adjustable bias to the motion vector scores with the lowest SAD score generated from the third search stage 110. The state 204b may apply the second adjustable bias to the motion vector scores with the lowest SAD score generated by the fourth search stage 112. The state 252 may compare the motion vector scores between the states 208a and 208b. The state 210 may select a final motion vector for each target block position.

The present invention may (i) provide a hierarchical motion estimation search program available on a number of processors and (ii) be suitable for MPEG-4 standards which includes image dimensions of varying horizontal and vertical sizes. The present invention may combine techniques that handle varying image resolutions in the horizontal direction with techniques that are appropriate for images below certain vertical dimensions. The present invention may take into account MPEG-4 specific standards of hierarchical unrestricted motion estimation and multi block-size motion estimation.

The present invention provides a method for performing motion estimation that may be suitable for image sequences with varying horizontal and vertical resolutions. The present invention may support varying horizontal and vertical resolution combinations which may be supported by MPEG-4. The present invention provides an improvement over conventional hierarchical motion search programs.

The function performed by the flow diagram of FIGS. 4-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:
1. A method for implementing motion estimation in an encoder device, comprising the steps of:
   (A) performing a first stage motion estimation search during inter-prediction on one or more first search blocks of sub-sampled images to generate a first plurality of motion vector scores, wherein said sub-sampled images comprise a resolution less than a full resolution of one or more source images;
   (B) applying a first adjustable bias to any one or more of said first plurality of motion vector scores with a lowest sum of absolute differences score;
   (C) selecting a motion vector with a lowest adjusted score in response to applying said first adjustable bias;
   (D) performing a second stage motion estimation search on one or more second search blocks of non-sub-sampled images to generate a second plurality of motion vector scores with a selected motion vector with said lowest adjusted score, wherein (i) said non-sub-sampled images comprise a full resolution of said source images and (ii) said one or more second search blocks are determined based on said selected motion vector;
   (E) applying a second adjustable bias to any one or more of said second plurality of motion vector scores with the lowest sum of absolute differences score, wherein said second adjustable bias is calculated using statistical analysis of a displacement error between one or more target frames and reference frames after applying the results of step (D); and
   (F) selecting a final motion vector from the results of step (B) or step (E) to be presented as part of a bitstream by said encoder for each target block position.

2. The method according to claim 1, wherein step (A) further comprises the step of:
   performing a motion estimation search using a quarter resolution sub-sampled image of said first search block.

3. The method according to claim 2, further comprising the step of:
   selecting displaced motion vectors from said quarter resolution sub-sampled image based on motion estimation scores.

4. The method according to claim 3, further comprising the step of:
   performing a motion estimation search with selected displaced motion vectors using a half resolution sub-sampled image of said first search blocks.

5. The method according to claim 4, further comprising the step of:
   performing an independent motion estimation search using a half resolution sub-sampled image of said second search blocks.

6. The method according to claim 5, further comprising the step of:
   applying said first adjustable bias to results generated from performing said motion estimation search with said displaced motion vectors on said half resolution sub-sampled image; and
   applying said first adjustable bias to results generated from said independent motion estimation search on said half resolution sub-sampled image.

7. The method according to claim 1, wherein step (B) further comprises the step of:
   obtaining said first adjustable bias based on predetermined operating procedures.

8. The method according to claim 1, wherein step (D) further comprises the step of:
   performing a motion estimation search on a displaced full resolution 16×16 target block on a non-sub-sampled image with said motion vector having said lowest adjusted score as selected in step (C).

9. The method according to claim 8, further comprising the step of:
   selecting displaced vectors from said 16×16 target block based on motion estimation scores.

10. The method according to claim 9, further comprising the step of:
    performing a half-pixel motion estimation search with selected displaced vectors on a full resolution 16×16 target block on one of said non-sub-sampled images.

11. The method according to claim 10, further comprising the step of:
    performing a motion estimation search on displaced full resolution four 8×8 target blocks with said motion vector having said lowest adjusted score as selected in step (C).

12. The method according to claim 11, further comprising the step of:
    selecting displaced vectors from said full resolution four 8×8 target blocks based on motion estimation scores.

13. The method according to claim 12, further comprising the step of:
    performing a half-pixel motion estimation search with said selected displaced vectors on said full resolution four 8×8 target blocks on said non-sub-sampled image.

14. The method according to claim 13, further comprising the step of:
    applying said second adjustable bias to results generated from performing a half-pixel motion estimation search with said displaced vectors on said full resolution 16×16 target block; and
    applying said second adjustable bias to results generated from performing said half-pixel motion estimation search with said displaced vectors on said full resolution four 8×8 target blocks on said non-sub-sampled image.

15. The method according to claim 1, wherein step (E) further comprises the step of:
    obtaining said second adjustable bias based on predetermined operating procedures.

16. The method according to claim 1, further comprising the step of:
    padding original reference images with an appropriate pixel-replication pattern in one of a (i) horizontal direction, (ii) a vertical direction and (iii) both a vertical and horizontal direction.

17. An apparatus comprising:
    circuit for performing a first stage motion estimation search during inter-prediction on one or more first search blocks of sub-sampled images to generate a first plurality of motion vector scores, wherein said sub-sampled images comprise a resolution less than a full resolution of one or more source images;
    circuit for applying a first adjustable bias to any one or more of said first plurality of motion vectors with a lowest sum of absolute difference;
    circuit for selecting a motion vector with a lowest adjusted score in response to applying said first adjustable bias;
    circuit for performing a second stage motion estimation search on one or more second search blocks of non-sub-sampled images to generate a second plurality of motion vector scores with a selected motion vector with said lowest adjusted score, wherein (i) said non-sub-sampled images comprise a full resolution of said source images and (ii) said one or more second search blocks are determined based on said selected motion vector;

circuit for applying a second adjustable bias to any one or more of said second plurality of motion vectors with said lowest sum of absolute difference, wherein said second adjustable bias is calculated using statistical analysis of a displacement error between one or more target frames and reference frames after applying the results of step (D); and circuit for selecting a final motion vector for each target block position from the results of said first stage motion estimation or said second stage motion estimation.

18. An apparatus comprising:

a first search phase circuit configured to (i) perform a first motion estimation search during inter-prediction on one or more first search blocks of sub-sampled images, wherein said sub-sampled images comprise a resolution less than a full resolution of one or more source images, (ii) generate a first plurality of motion vector scores, (iii) apply a first adjustable bias to said first plurality of motion vector scores with a lowest sum of absolute differences score and (iv) select a motion vector with a lowest adjusted score in response to applying said first adjustable bias; and a second phase circuit configured to (i) perform a second motion estimation search on one or more second search blocks of non-sub-sampled images with said lowest sum of absolute difference score adjusted by said first adjustable bias, wherein (a) said non-sub-sampled images comprise a full resolution of said source images and (b) said second search blocks are determined based on said selected motion vector, (ii) generate a second plurality of motion vector scores, (iii) apply a second adjustable bias to said second plurality of motion vector scores with a lowest sum of absolute differences score, wherein said second adjustable bias is calculated using statistical analysis of a displacement error between one or more target frames and reference frames after applying the results of step (D) and (iv) select a final motion vector for each target block position from the results of said first stage motion estimation or said second stage motion estimation.

19. The apparatus according to claim 18, wherein said first phase circuit comprises:

a first search stage configured to (i) perform a motion estimation search on a quarter resolution sub-sampled image, (ii) select displaced motion vectors from said quarter resolution sub-sampled image based on motion estimation scores, and (iii) perform a motion estimation search with said selected displaced motion vectors on a half resolution sub-sampled image; and a second search stage configured to independently perform a motion estimation search on a half-resolution sub-sampled image.

20. The apparatus according to claim 19, wherein said second phase circuit further comprises:

a third search stage configured to (i) perform a motion estimation search with said lowest sum of absolute difference score by said first adjustable bias on a full resolution 16×16 target block and (ii) perform a half-pixel motion estimation search with said displaced motion vector scores from said motion estimation search on said full resolution 16×16 target block; and a fourth search stage configured to (i) perform a motion estimation search with said lowest sum of absolute difference score by said first adjustable bias on a full resolution four 8×8 target blocks and (ii) perform a half-pixel motion estimation search with said displaced motion vector scores from said motion estimation search on said full resolution four 8×8 target blocks.

* * * * *